US008150550B2

(12) United States Patent
Suga et al.

(10) Patent No.: US 8,150,550 B2
(45) Date of Patent: Apr. 3, 2012

(54) LEGGED ROBOT

(75) Inventors: Keisuke Suga, Aichi-ken (JP); Daisaku Honda, Aichi-ken (JP); Toru Miyagawa, Brussels (BE); Ryosuke Tajima, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 554 days.

(21) Appl. No.: 12/439,195

(22) PCT Filed: Sep. 6, 2007

(86) PCT No.: PCT/JP2007/067777
§ 371 (c)(1),
(2), (4) Date: Feb. 27, 2009

(87) PCT Pub. No.: WO2008/029955
PCT Pub. Date: Mar. 13, 2008

(65) Prior Publication Data
US 2010/0017028 A1 Jan. 21, 2010

(30) Foreign Application Priority Data
Sep. 6, 2006 (JP) ................................ 2006-242169

(51) Int. Cl.
*G05B 19/18* (2006.01)
*G05B 15/00* (2006.01)
*G05B 19/00* (2006.01)
*G06F 19/00* (2011.01)

(52) U.S. Cl. ........ 700/253; 700/245; 700/250; 700/254; 700/258; 700/260; 700/261; 901/1; 901/15

(58) Field of Classification Search ........................ None
See application file for complete search history.

(56) References Cited

U.S. PATENT DOCUMENTS
2005/0151497 A1 7/2005 Nagasaka
(Continued)

FOREIGN PATENT DOCUMENTS
EP 1 473 122 A1 11/2004
(Continued)

OTHER PUBLICATIONS

Hiroshi Kimura, et al.: "A role of CPG (Central Pattern Generator) on the legged mobility, Toward unified generation of the adaptive walking and runninig", Journal of the Society of Instrument and Control Engineers of Japan, vol. 44, No. 9, 2005, pp. 602-608.

(Continued)

*Primary Examiner* — Khoi Tran
*Assistant Examiner* — Bao Long T Nguyen
(74) *Attorney, Agent, or Firm* — Kenyon & Kenyon LLP

(57) ABSTRACT

A legged robot that runs while repeating a jump cycle including a ground-contact phase from a landing to a takeoff and an aerial phase from a takeoff to a landing is provided. The legged robot adjusts the landing timing after a jump in accordance with a planned timing, thereby attaining a smooth landing. A measuring unit of the legged robot measures an actual aerial phase period in a k-th jump cycle. A subtractor calculates a time difference between a target aerial phase period and the actual aerial phase period in the k-th jump cycle. A target velocity determining unit calculates a target vertical velocity of a center of gravity on a takeoff timing in a (k+1)-th jump cycle so as to eliminate the time difference. Motors in respective joints are controlled so as to realize the calculated target vertical velocity in the (k+1)-th jump cycle. As a result, the time difference generated in the k-th jump cycle in the (k+1)-th jump cycle can be compensated, thereby adjusting the landing timing with the planned landing timing, resulting in the jump motion with smooth landing.

4 Claims, 3 Drawing Sheets

U.S. PATENT DOCUMENTS

| | | | |
|---|---|---|---|
| 2006/0106495 A1 * | 5/2006 | Takenaka et al. | 700/253 |
| 2008/0046123 A1 | 2/2008 | Takenaka et al. | |
| 2009/0187275 A1 | 7/2009 | Suga et al. | |

FOREIGN PATENT DOCUMENTS

| | | |
|---|---|---|
| EP | 1 502 711 A1 | 2/2005 |
| JP | 2003-080477 A | 3/2003 |
| JP | 2004-167676 A | 6/2004 |
| JP | 2005-177884 A | 7/2005 |
| JP | 2006-212736 A | 8/2006 |
| WO | WO 03057429 A1 | 7/2003 |
| WO | 03/090978 A1 | 11/2003 |
| WO | WO 2006/064597 | 6/2006 |

OTHER PUBLICATIONS

Japanese Office Action mailed Nov. 16, 2010 of JP 2006-242169 and English translation thereof.

Zu Guang Zhang, et al.: *Quadruped Running Control Using Delayed Feedback*, Dai 18 Kai Jiritsu Bunsan System Symposium Yokoshu, Jun. 2006, pp. 163-168.

Zu Guang Zhang, et al.: *Running of a Quadruped Robot on Irregular Terrain Using Delayed Feedback Control*, Dai 10 Kai Robotics Symposium Yokoshu, Mar. 2005, pp. 531-536.

* cited by examiner

LEGGED ROBOT

CROSS-REFERENCE TO RELATED APPLICATION

This is a 371 national phase application of PCT/JP2007/067777 filed 6 Sep. 2007, which claims priority of Japanese Patent Application No. 2006-242169 filed 6 Sep. 2006, the contents of which are incorporated herein by reference.

BACKGROUND OF THE INVENTION

1. Field of the Invention

The present invention relates to a legged robot capable of running. It should be noted that a legged robot may be simply referred to as "robot" hereinafter.

2. Description of the Prior Art

Legged robots which can move by driving the joints disposed in the legs are being developed. The number of the legs may vary in robots. A biped robot moves like a human, and a quadruped robot moves like an animal. A monoped robot moves while hopping.

Humans and animals present a behavior of "running" rather than "walking" for a fast travel. It is also preferable for legged robots being able to perform the behavior of "running" for a fast travel. "Walking" is a movement in which at least one of the legs is in contact with the ground; whereas "running" is a movement that a state in which at least one of the legs is in contact with the ground and a state in which all the legs are off the ground are repeated periodically. The state in which one of the legs is in contact with the ground which lasts during a period from the landing to the takeoff of that leg, is hereinafter referred to as "ground-contact phase". More specifically, the "ground-contact (ground-contact timing)" is a timing at which the state of all the legs being off the ground transitions to the state of having one of the legs touching the ground. "Takeoff (takeoff timing)" is a timing at which the state of having one of the legs in contact with the ground transitions to the state of having all the legs taken off the ground. The state in which all the legs are off the ground is during a period from the takeoff to the landing, which is hereinafter referred to as "aerial phase". One periodic cycle constituted by the ground-contact phase and the aerial phase is referred to as "jump cycle". A motion of a robot across one jump cycle is referred to as a "jump motion". Thus, "running" herein means moving while repeating the jump cycle constituted by the ground-contact phase and the aerial phase. The motion of the legged robot having one leg and that moves while hopping is also referred to as "running", in which the jump cycle is repeated. Moreover, the period from the landing to the takeoff of the leg is referred to as "ground-contact phase period", and the period from the takeoff to the landing is referred to as "aerial phase period" hereinafter.

A legged robot which runs (jumps) is disclosed in Japanese Patent Application Publication No. 2003-80477 and in WO 2003/057429.

BRIEF SUMMARY OF THE INVENTION

Motions of a robot such as walking and running are analyzed by computer simulations in advance. Motion data for realizing stable walking and running for the robot is generated based on the result of the analysis. The motion data is described as trajectories of a trunk link and a toe link, or a trajectory of the center of gravity of the robot. The motion data determines the walking motion and the running motion of the robot, and is thus sometimes referred to as "gait data".

When the robot is actually operated, the gait data is converted into time series data of a target joint angle of respective joint, and the respective joints are thereby driven accordingly.

It is not possible to perfectly simulate the motion of the robot. Therefore, there may be errors between the motion realized on a computer in accordance with the generated motion data and the actual motion. These errors are sometimes referred to as "simulation errors". As in the "walking" motion, a successive feedback control during the actual motion of the robot compensates for the simulation errors.

As in the case of "running", during the transition from the aerial phase to the ground-contact phase, the state of the legged robot discontinuously shifts from the airborne state (state in which the legs are not in contact with the ground) to the state in which the leg comes in contact with the ground. This discontinuous transition timing is, in other words, the landing timing described above. Upon the landing timing, if the simulation errors become discontinuously obvious, the compensation by the successive feedback control as in the case of walking may be difficult; and the motion of the robot may easily become instable. Especially for the legged robot having two legs, instability in the motion may lead to a tumble. Therefore, in order to achieve a stable running, it is desirable for the legged robot to eliminate the influence of the simulation errors on the landing timing as much as possible.

One of the major simulation errors which discontinuously appear upon the landing timing is a deviation between the landing timing obtained by the simulation (namely, the landing timing based on the gait data) and the landing timing in the actual running of the robot. The landing timing is the timing at which the aerial phase period has elapsed since the takeoff timing. The aerial phase period is proportional to velocity (vertical velocity) in the vertical direction of the center of gravity of the robot at takeoff. The present invention adjusts the actual landing timing so as to coincide with the landing timing obtained by the simulation by controlling the vertical velocity of the center of gravity upon the takeoff. In other words, the present invention realizes a legged robot which periodically repeats the jump motion, and can smoothly land by compensating the simulation error of the landing timing.

The present invention focuses on a fact that the "running" and the "hopping" are continuation of the periodic jump motion. Since the jump motion is periodical, it is expected that a time difference between the target aerial phase period (target value of the aerial phase period) and the actual aerial phase period measured when the robot has actually jumped in the pervious jump cycle is approximately the same value in the current jump cycle. Therefore, if the vertical velocity of the center of gravity at the takeoff timing in the current jump cycle is determined based on the time difference in the previous jump cycle, it is possible to eliminate the time difference in the current jump cycle. In other words, it is possible to compensate the simulation error on the landing timing. Although it is desirable to determine the vertical velocity of the center of gravity at the takeoff timing in the current jump cycle based on the time difference in the previous jump cycle, a similar effect is provided if the vertical velocity of the center of gravity at the takeoff timing in the current jump cycle is determined based on the time difference in a specific past jump cycle. The vertical velocity may be determined based on time differences of a plurality of past jump cycles. In other words, such an effect is provided by driving joints of the robot based on the time difference between the target aerial phase period and the actual aerial phase period.

The present invention is realized as a legged robot that runs while repeating the jump cycle including the ground-contact phase that is defined by the time period from a landing to a takeoff, and the aerial phase that is defined by the time period from a takeoff to a landing. This legged robot includes at least one leg that includes joints, a storage that stores target aerial phase periods (target value of the aerial phase period), measuring means that measures an actual aerial phase period, and drive means that drives the joints based on a time difference between the target aerial phase period and the actual aerial phase period.

According to the above legged robot, the joints are driven based on the time difference between the target aerial phase period and the actual aerial phase period. As a result, as described above, it is possible to coincide the landing timing when the robot actually jumps with the landing timing obtained by the simulation in advance.

The legged robot according to the present invention preferably further includes timing determining means that determines a takeoff timing and a landing timing by detecting a contact between the leg and the ground. The actual aerial phase period is measured by the timing determining means. In other words, the measuring means can measure the actual aerial phase period by measuring the period from the takeoff timing to the landing timing which are determined by the timing determining means. In order to detect the state in which the leg comes in contact with the ground, a contact sensor may be provided on a bottom end (e.g. sole of the foot) of the leg.

Moreover, the legged robot according to the present invention preferably includes velocity determining means that determines a target vertical velocity of the center of gravity of the legged robot at the takeoff timing in the current jump cycle based on the time difference in the previous jump cycle. In this case, the drive means may drive the joints so as to realize the determined target vertical velocity.

The velocity determining means determines the target vertical velocity of the center of gravity of the legged robot upon the takeoff timing in the current jump cycle based on the time difference in the previous jump cycle (past jump cycle).

A contact sensor, for example, may easily and precisely detect whether the leg is in contact with the ground or not. Therefore, the actual aerial phase period can be easily and precisely detected by the contact sensor. On the other hand, it is difficult to precisely measure the velocity of the center of gravity. According to one aspect of the present invention, the target vertical velocity of the center of gravity of the legged robot at the takeoff timing in the current jump cycle is determined based on the time difference in the previous jump cycle (past jump cycle). As a result, the target vertical velocity of the center of gravity of the legged robot can be determined without measuring the actual velocity of the center of gravity at the takeoff timing.

In order to actually attain the target vertical velocity determined by the velocity determining means, the legged robot preferably includes target trajectory generating means and target joint angle calculating means as described below. The target trajectory generating means generates a trajectory of the center of gravity in the ground-contact phase of the current jump cycle, whereas the trajectory of the center of gravity is generated such that the vertical velocity gradually approaches the determined target vertical velocity. The target joint angle calculating means calculates time series data of the target joint angle of each joint in the ground-contact phase of the current jump cycle based on the generated target trajectory. In this case, the drive means may drive the joints based on the time series data of the target joint angles.

The above configuration enables a smooth shift of vertical velocity of the center of gravity in the ground-contact phase (i.e. period from the landing to the next takeoff). The motion of the robot from the landing to the takeoff may be smoothed.

The velocity determining means of the legged robot preferably determines the target vertical velocity as described below. First, the velocity determining means calculates a velocity correction value approximately proportional to the time difference in the previous jump cycle. The velocity determining means then determines the target vertical velocity in the current jump cycle by adding the velocity correction value to the target vertical velocity in the previous jump cycle.

As described above, the actual aerial phase period is proportional to the vertical velocity of the center of gravity at the takeoff timing of the robot. The time difference between the target aerial phase period and the actual aerial phase period is thus proportional to the error between the target vertical velocity and the actual vertical velocity of the center of gravity at the takeoff timing. According to the above configuration, it is possible to precisely compensate the error in the velocity. In other words, it is possible to precisely compensate the deviation of the landing timing.

According to the present invention, it is possible to provide a legged robot which runs while adjusting the actual landing timing so as to coincide with the landing timing planned in advance by the computer simulation.

DETAILED DESCRIPTION OF THE INVENTION

A description will now be given of a preferable legged robot with reference to drawings.

Figure 1:
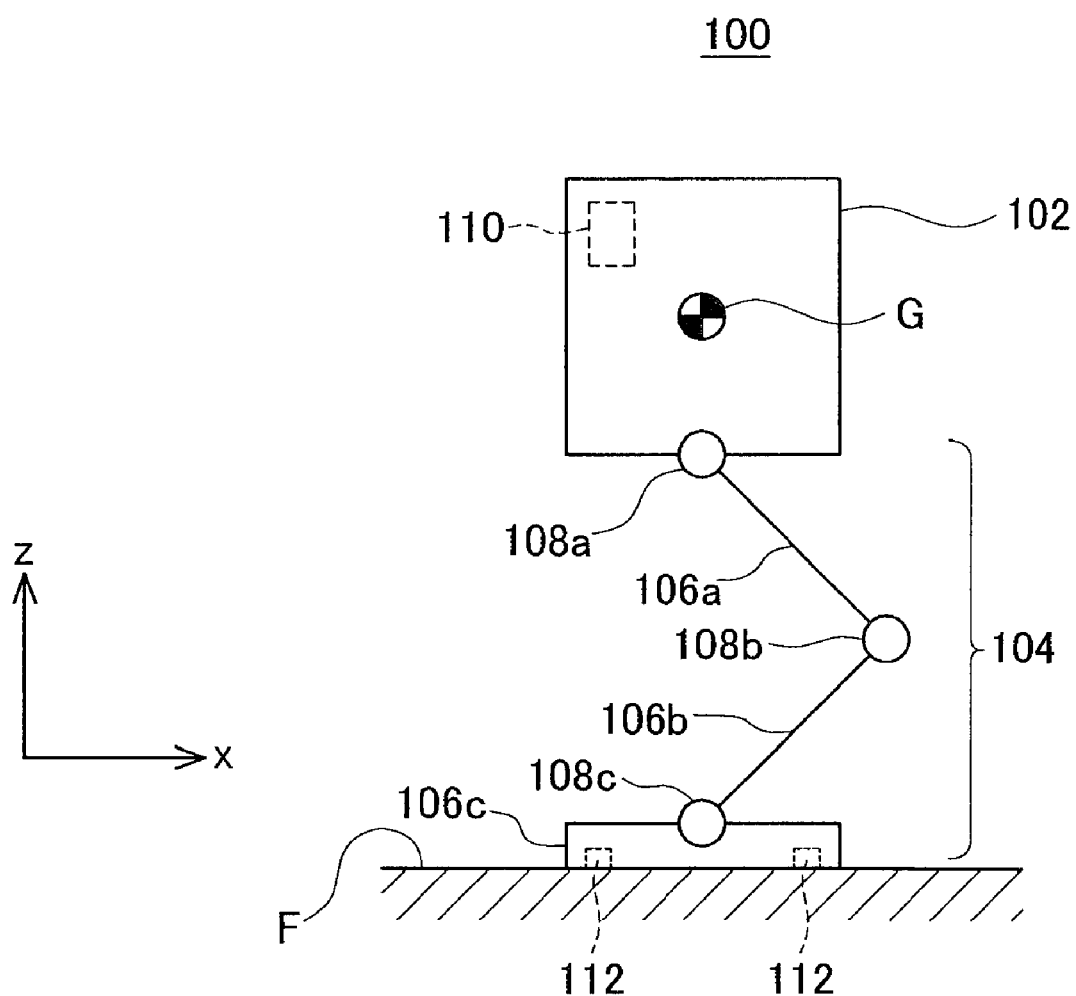
FIG. 1 is a schematic side view of a legged robot according to an embodiment.

FIG. 1 shows a schematic side view of a legged robot 100. The legged robot 100 is a robot in which one leg 104 is connected to a trunk link 102. Although the robot may have any number of legs, the present embodiment exemplifies a legged robot having one leg 104 for the sake of easy understanding of the motion of the robot.

The leg 104 of the robot 100 includes three links 106a, 106b, 106c, and three joints 108a, 108b, 108c. The three links 106a, 106b, 106c are hereinafter referred to as "links 106" in general. Similarly, the three joints 108a, 108b, 108c are collectively referred to as "joints 108" hereinafter.

The joint 108a rotatably connects the trunk link 102 and the link 106a with each other. The joint 108b rotatably connects the link 106a and the link 106b with each other. The joint 108c rotatably connects the link 106b and the link 106c with each other. The link 106c is a distal end link of the leg 104, and may be referred to as "foot link 106c".

Contact sensors 112 which detect whether the foot link 106c and the floor F (ground) are in contact are provided on a bottom surface of the foot link 106c.

The joints 108 incorporate motors (not shown) respectively. The motor is driven by a controller 110. A joint angle of the respective joints 108 (namely, relative positional relationship between the two links connected to each of the joints 108) can be controlled by driving the motors.

The controller 110 properly drives the joints 108, and the legged robot 100 can periodically repeat jumping.

The alphabetical reference G in FIG. 1 denotes the center of gravity of the entire legged robot 100. The position of the center of gravity G shifts depending on the attitude of the leg 104. Since the mass distribution of the respective links 106 of the leg 104 and the trunk link 102 is known, the position of the center of gravity G can be obtained based on geometrical calculations from the joint angles of the respective joints 108.

Figure 2:
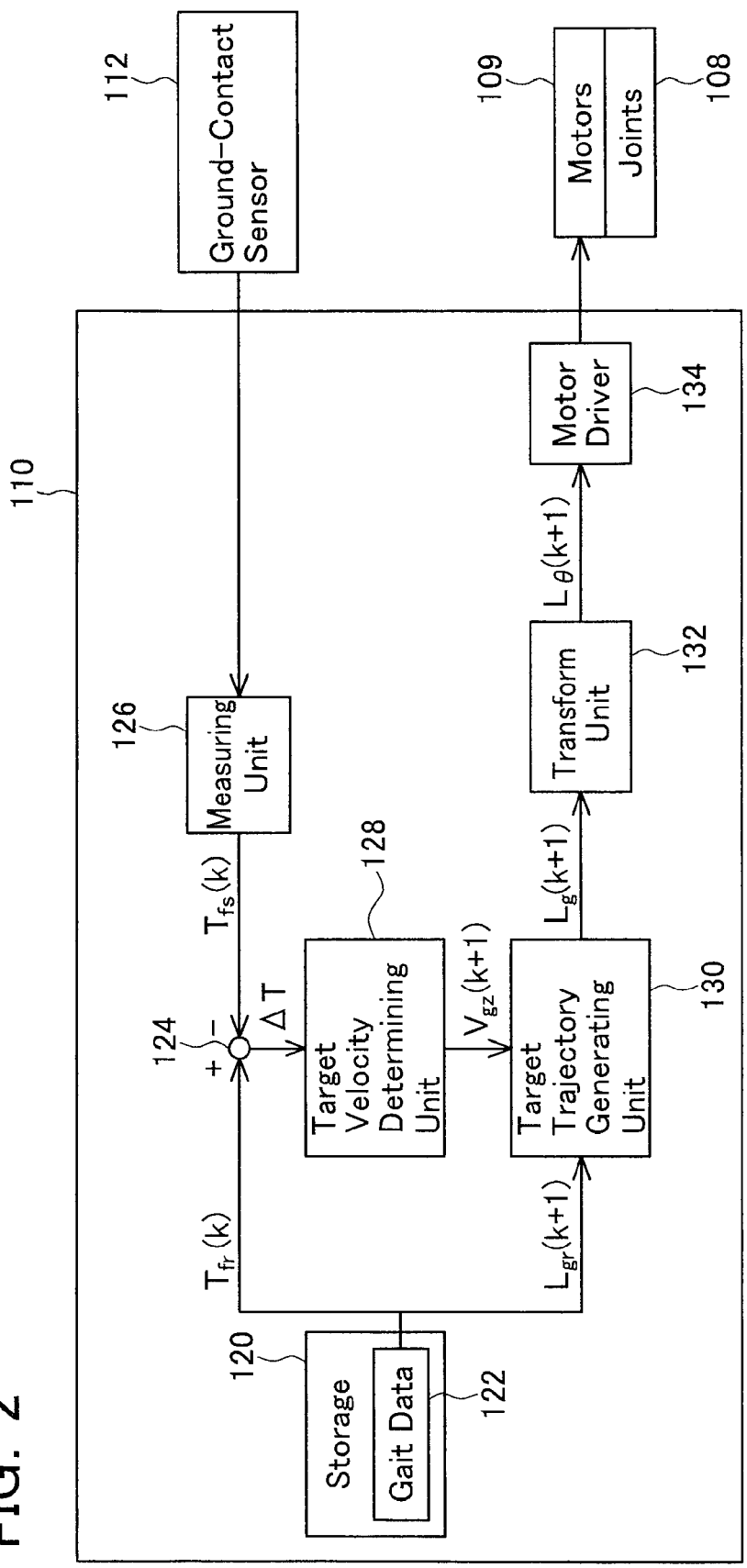
FIG. 2 is a block diagram of a controller for the legged robot.

FIG. 2 shows a block diagram of the controller 110.

The controller 110 includes a storage 120, a subtractor (differentiator) 124, a measuring unit 126, a target velocity determining unit 128, a target trajectory generating unit 130, a transform unit 132, and a motor driver 134. The storage 120 specifically is a storage device such as a memory or a hard disk. The subtractor 124, the measuring unit 126, the target velocity determining unit 128, the target trajectory generating unit 130, the transform unit 132, and the motor driver 134 are specifically implemented as software modules in the controller 110.

The storage 120 stores gait data 122. The gait data 122 includes data of trajectories of the foot link 106c and data of trajectories of the center of gravity G. The trajectory data of the foot link 106c is time-series data of the position and the attitude of the foot link 106c. The trajectory data of the center of gravity G is time-series data of the position of the center of gravity G. The gait data 122 does not include trajectory data of the trunk link 102. However, since the mass distribution of all the links including the trunk link 102 is known, it is possible to obtain the trajectory of the trunk link 102 based on the trajectory of the center of gravity G and the trajectory of the foot link 106c. Therefore, though the gait data 122 does not explicitly include the trajectory data of the trunk link, the gait data 122 includes the information equivalent to the trajectory data of the trunk link.

Since the trajectory data is time-series data of positions in a motion, it is possible to obtain the velocity and the acceleration based on the trajectory data.

The gait data 122 is generated in advance by simulation of the motions of the legged robot 100 on a computer, and is then stored in the storage 120. When the legged robot 100 is actually operated, the trajectory data is read out from the gait data 122, and time-series data of the target joint angle of the respective joint 108 is generated from the trajectory data. Transform functions for transforming the trajectory data to the target joint angles are determined based on the geometrical connection configuration of the links of the legged robot 100. The motion described by the gait data 122 is realized by driving the motors 109 installed in the respective joints 108 based on the target joint angles of the respective joints 108. However, a simulation model of the legged robot 100 used for generating the gait data 122 does not precisely model the actual robot. As a result, there may be error between the motion described by the gait data 122 and the actual motion realized based on the gait data 122. A description will now be given, with reference to FIG. 2 and FIG. 3, of a function for reducing the error in the landing timing when the legged robot 100 jumps periodically.

Figure 3:
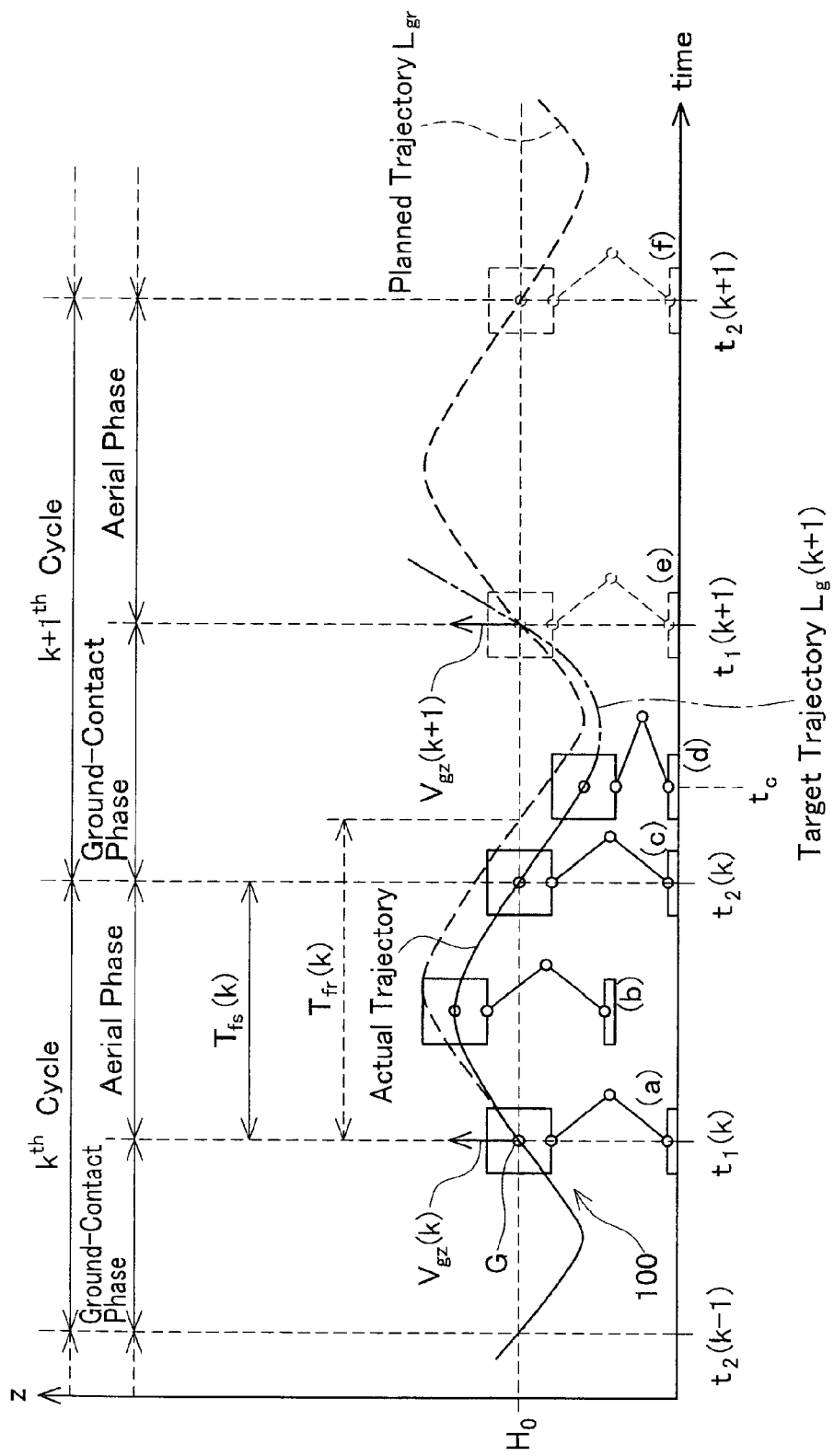
FIG. 3 describes a cyclic jump motion of the legged robot.

FIG. 3 depicts a cyclic jump motion of the legged robot 100. The vertical axis represents a position of the center of gravity G in a Z direction (vertical direction), and the horizontal axis represents time in FIG. 3. Time point $t_1(k)$ represents a takeoff timing in a k-th jump cycle. Time point $t_2(k)$ represents a landing timing in the k-th jump cycle. The period from time point $t_2(k-1)$ to time point $t_2(k)$ represents the k-th jump cycle in FIG. 3. Moreover, the period from time point $t_2(k-1)$ to time point $t_1(k)$ represents an actual ground-contact phase period in the k-th jump cycle. The period from time point $t_1(k)$ to time point $t_2(k)$ in the other hand represents an actual aerial phase period in the k-th jump cycle. The "k-th jump cycle" is simply referred to as "k-th cycle" hereinafter. It is possible to uniquely obtain a target value of the aerial phase period (target aerial phase period) of the respective jump cycles from the time-series data of the position of the foot link 106c. In other words, the target aerial phase period is contained in the gait data 122, and is stored in the storage 120.

A velocity component in the vertical direction (vertical velocity) of the center of gravity G of the legged robot 100 will be focused and described, and the description of a velocity of the center of gravity G in the horizontal direction will be omitted. With regard to the horizontal movement of the legged robot 100, the motion of the center of gravity G moves with a constant-velocity in the aerial phase, and does not affect the landing timing.

A broken curve in FIG. 3 is a planned trajectory $L_{gr}$ of the center of gravity G of the legged robot 100. The "planned trajectory $L_{gr}$" is the trajectory of the center of gravity G stored in the gait data 122. It should be noted that the planned trajectory of the center of gravity G in the k-th cycle is specifically represented as $L_{gr}(k)$. Note that the term "planned trajectory $L_{gr}$" is used in a case where a specific jump cycle is thereby not intended.

The legged robot 100 takes off (lifts all the legs off the ground) at the time point $t_1(k)$, and touches down (contacts any of the legs with the ground) at the time point $t_2(k)$. It should be noted that "$t_c$" represents the current time point. The actual trajectory of the center of gravity G of the legged robot 100 up to the time point $t_c$ is represented by a solid line. The time point $t_f(k)$ is the takeoff timing in the k-th cycle. The time point $t_2(k)$ is the landing timing in the k-th cycle.

The legged robot 100 is in contact with the ground at the time point $t_1(k)$ and the time point $t_2(k)$ as indicated by (a) and (c) in FIG. 3. The legged robot 100 is in the air during the aerial phase in the k-th cycle as indicated by (b) in FIG. 3. Moreover, the legged robot 100 takes a squatting attitude at the time point $t_c$ as indicated by (d).

As shown in FIG. 1, the ground-contact sensors 112 provided on the bottom end of the foot link 106c detect that the legged robot 100 takes off at the time point $t_1(k)$ and touches down at the time point $t_2(k)$. As shown in FIG. 2, output signals of the ground-contact sensors 112 are input to the measuring unit 126 of the controller 110. The measuring unit 126 measures the time period from the time point $t_1(k)$ to the time point $t_2(k)$, namely the actual aerial phase period $T_{fs}(k)$ of the k-th cycle. The takeoff timing is determined as a timing at which all the legs have taken off the ground based on the output of the ground-contact sensors 112. Moreover, the landing timing is determined as timing at which at least one leg comes in contact with the ground after all the legs have taken off the ground. These determinations are made by the measuring unit 126. In other words, the ground-contact sensors 112 and the measuring unit 126 can be considered as timing determining unit which determines the takeoff timing and the landing timing.

The actual aerial phase period $T_{fs}(k)$ measured by the measuring unit 126 is input to the subtractor 124. The target period of the aerial phase in the k-th cycle $T_{fr}(k)$ (target aerial phase period) of the gait data 122 in the storage 120 is input to the subtractor 124. This target aerial phase period $T_{fr}(k)$ is obtained based on the planned trajectory $L_{gr}$ of the center of gravity G stored in the gait data 122 and a height $H_0$ of the center of gravity G at the takeoff timing and on the landing timing as shown in FIG. 3. The subtractor 124 outputs a time difference $\Delta T$ obtained by subtracting the actual aerial phase period $T_{fs}(k)$ from the target aerial phase period $T_{fr}(k)$. The output time difference $\Delta T$ is input to the target velocity determining unit 128.

The target velocity determining unit 128 determines a target velocity in the vertical direction (target vertical velocity) $V_{gz}(k+1)$ of the center of gravity G at the takeoff timing in the current (k+1)-th cycle based on the time difference $\Delta T$. The target vertical velocity $V_{gz}(k+1)$ is specifically determined by the following equation (1):

$$V_{gz}(k+1) = V_{gz}(k) + (g/2) \times \Delta T \quad (1)$$

In this equation, "g" denotes the gravity acceleration. $V_{gz}(k)$ is the target velocity in the vertical direction (target vertical velocity) of the center of gravity G at the takeoff timing in the previous k-th cycle, and is determined by a previous calculation of the target velocity determining unit 128.

The equation (1) is interpreted as follows. In the previous k-th cycle, the respective joints are controlled such that the target vertical velocity $V_{gz}(k)$ of the center of gravity G is attained at the takeoff timing. The target vertical velocity $V_{gz}(k)$ is a velocity adjusted such that the aerial phase period in the k-th cycle attains the target aerial phase period $T_{fr}(k)$. However, the actual aerial phase period in the k-th cycle as measured at the end of the k-th cycle is $T_{fs}(k)$. The time difference $\Delta T$ between the target aerial phase period $T_{fr}(k)$ and the actual aerial phase period $T_{fs}(k)$ had occurred due to the deviation of the actual vertical velocity upon the takeoff timing in the k-th cycle from the given target vertical velocity $V_{gz}(k)$. This difference is generated by factors which are not considered in the simulation for calculating the target vertical velocity $V_{gz}(k)$ of the center of gravity G in the k-th cycle. The aforesaid factors which are not considered include physical phenomena which are actually present in transform functions for generating command values to supply to the motors of the joints from the target vertical velocity $V_{gz}(k)$. More specifically, the physical phenomena which are not considered may include deformation of the links and viscosity of the motors.

On this occasion, it is important to reduce $\Delta T$ to zero in the current (k+1)-th cycle. The only external force applied to the center of gravity G is the gravity acceleration "g" in the aerial phase. Therefore, a vertical velocity difference $\Delta V$ (difference between the target velocity $V_{gz}(k)$ and the actual velocity) of the center of gravity G caused by the time difference $\Delta T$ is given by $(g/2) \times \Delta T$. Then, the target vertical velocity of the center of gravity G at the takeoff timing in the current (k+1)-th cycle is increased by $\Delta V$. As a result, it is possible to adjust the actual aerial phase period $T_{fs}(k+1)$ so as to coincide with the target aerial phase period $T_{fr}(k+1)$ in the (k+1)-th cycle.

In accordance with the aforementioned logic, the target velocity determining unit 128 determines the target vertical velocity $V_{gs}(k+1)$ which compensates the time difference $\Delta T$ in the current (k+1)-th cycle.

The determined target vertical velocity $V_{gs}(k+1)$ is input to the target trajectory generating unit 130. The target trajectory generating unit 130 generates a target trajectory of the center of gravity G in the ground-contact phase of the (k+1)-th cycle (i.e. from the time point $t_2(k)$ to a time point $t_1(k+1)$) based on the target vertical velocity $V_{gs}(k+1)$. Specifically, the target trajectory is generated as described below.

The measuring unit 126 outputs the actual aerial phase period $T_{fs}(k)$ after the time point $t_2(k)$ when the aerial phase in the previous k-th cycle ends. In other words, the target velocity determining unit 128 also determines the target vertical velocity $V_{gs}(k+1)$ after the time point $t_2(k)$. Therefore, when the target trajectory generating unit 130 carries out the process, the legged robot 100 is in a state after the time point $t_2(k)$, e.g. at the time point $t_c$ in FIG. 3. The target trajectory generating unit 130 generates a target trajectory $L_g(k+1)$ of the center of gravity G from the time point $t_c$ to the end of the ground-contact phase in the current (k+1)-th cycle (i.e. time point $t_1(k+1)$). The target trajectory $L_g(k+1)$ is generated as described below. The target trajectory generating unit 130 reads out a planned trajectory $L_{gr}(k+1)$ of the center of gravity G in the (k+1)-th cycle stored in the gait data 122 from the storage 120. The target trajectory generating unit 130 then identifies the planned takeoff timing $t_1(k+1)$ in the (k+1)-th cycle. It is known that the center of gravity G of the robot 100 is located at the position (d) at the current time point (time point $T_c$). Therefore, it is possible to serially connect the position at the time point $T_c$ to the position at the height $H_0$ at the time point $t_1(k+1)$ with a smooth continuous curve. This continuous curve is to be the target trajectory $L_g(k+1)$ of the center of gravity G. Moreover, on this occasion, the target vertical velocity of the center of gravity G at the time point $t_1(k+1)$ is determined as the target vertical velocity $V_{gz}(k+1)$ by the target velocity determining unit 128. Therefore, the vertical velocity of the center of gravity G is determined so as to approach the target vertical velocity $V_{gz}(k+1)$ as the center of gravity G approaches the end of the target trajectory $L_g(k+1)$. The velocity in the vertical direction of the center of gravity G is equal to the tangent line of the trajectory of the center of gravity G in FIG. 3. Therefore, if the target trajectory $L_g(k+1)$ of the center of gravity G is set such that the tangent line of the trajectory of the center of gravity G at the time point $t_1(k+1)$ coincides with the target vertical velocity $V_{gz}(k+1)$; it is possible to generate the target trajectory which gradually reaches the target trajectory $L_g(k+1)$ as it approaches the takeoff timing (time point $t_1(k+1)$). The target trajectory $L_g(k+1)$ generated as in the above operation is shown as a dashed-dotted line in FIG. 3.

It should be noted that a technique disclosed in Japanese Patent Publication Laid-Open No. 2006-212736 may be employed for determining the trajectory of the center of gravity G based on the velocity of the center of gravity G at the takeoff timing.

The target trajectory $L_g(k+1)$ generated by the target trajectory generating unit 130 is then input to the transform unit 132 shown in FIG. 2. The transform unit 132 calculates time-series data $L_\theta(k+1)$ of the target joint angle of the respective joints based on the input target trajectory $L_g(k+1)$ and the trajectory of the foot link 106c stored in the gait data 122. This transform is carried out as follows. The trajectory of the trunk link 102 is calculated based on the target trajectory $L_g(k+1)$ and the trajectory of the foot link 106c. Since the trajectory is time-series data of the position and the attitude, it is possible to obtain the position and the attitude of the foot link 106c and the trunk link 102 at the respective time points. After the position and the attitude of the foot link 106c and the trunk link 102 are obtained at the respective time points, the target joint angle data $L_\theta(k+1)$ can be calculated in accordance with the geometrical structure of the legged robot 100. It should be noted that the target joint angle data $L_\theta(k+1)$ is the time-series data of the target joint angle of the respective joints at each of the respective time points. The process to calculate the joint angle of respective joints based on the position and the attitude of respective points of a robot is well known as "inverse kinematics of the robot".

The time-series data $L_\theta(k+1)$ of the target joint angles of the respective joints generated by the transform unit 132 are transmitted to the motor driver 134. The motor driver 134 drives the motors 109 of the respective joints 108 so that the actual joint angles follow the time-series data $L_\theta(k+1)$ of the target joint angles.

In this configuration, the time difference $\Delta T$ generated in the previous k-th cycle is compensated at the current present (k+1)-th cycle. As a result, as indicated by (f) in FIG. 3, the position of the center of gravity G of the legged robot 100 on a landing timing (timing $t_2(k+1)$) in the current (k+1)-th cycle coincides with the planned trajectory $L_{gr}$ stored in the gait data 122. In other words, the legged robot 100 adjusts the actual landing timing so that it coincides with the planned landing timing in the gait data. As a result, the legged robot 100 achieves a smooth landing close to a motion planned as the planned trajectory $L_{gr}$ on the gait data. In other words, the legged robot 100 can "run" smoothly.

It should be noted that, as shown in FIG. 3, the deviation between the planned trajectory $L_{gr}$ (represented as the broken line) and the target trajectory $L_g(k+1)$ (represented as the dashed-dotted line) arises before and after the takeoff timing (timing $t_1(k+1)$) in the (k+1)-th cycle. This deviation is interpreted as follows. The target trajectory $L_g(k+1)$ is the target. On the other hand, the legged robot 100 does not follow the target trajectory $L_g(k+1)$ due to the simulation errors as described above. If the legged robot 100 follows the target trajectory $L_g(k+1)$, the actual trajectory substantially coincides with the planned trajectory $L_{gr}$ represented as the dashed-dotted line.

The landing timing can be predicted by measuring the distance between the foot and the floor immediately before the landing. Alternatively, the landing timing can be predicted in real time by measuring the vertical velocity of the center of gravity G at the takeoff timing. If the landing timing can be predicted in real time, the attitude of the legged robot 100 may be controlled so as to stably land based on the predicted result. However in the former case, the landing timing may be predicted just before the landing, and thus cannot secure a sufficient period for compensating the simulation errors. The latter case hardly measures the precise velocity of the center of gravity. In either case, it is difficult to control the attitude of the legged robot 100 so as to land stably.

On the other hand, according to the above embodiment, the vertical velocity of the center of gravity at the takeoff timing in the current (k+1)-th cycle is determined based on the time difference between the target aerial phase period and the actual aerial phase period in the previous k-th jump cycle. The actual aerial phase period can be easily and precisely measured by detecting the timing of contacting the leg of the legged robot 100 with the ground. Therefore, it is possible to precisely control the legged robot 100 so that the landing timing precisely coincides with the planned landing timing in the (k+1)-th cycle.

The above embodiment is directed to the legged robot 100 having only one leg for the sake of understanding the present invention easily. The present invention is applicable to a legged robot having a plurality of legs such as two or four legs. As for a legged robot having multiple legs, "one jump cycle" may be defined as a period in which each and all of the legs is operated for a cycle as described in the above embodiment.

Moreover, the configuration of the legged robot according to the above embodiment can be alternatively described in the following way. The subtractor 124 calculates the time difference between the target aerial phase period and the actual aerial phase period. The motor driver 134, which is the drive means configured to drive the joints, drives the joints 108 based on the time difference received through the target trajectory generating unit 130 and the transform unit 132.

The second term "$(g/2) \times \Delta T$" on the right side of the equation (1) corresponds to the amount of the correction for the target vertical velocity based on the time difference $\Delta T$. In this case, the equation (1) can be expressed in the following way. The target velocity determining unit 128 calculates the correction value "$(g/2) \times \Delta T$" for the target vertical velocity, which is approximately proportional to the time difference $\Delta T$ in the previous k-th cycle. The target velocity determining unit 128 then determines the target vertical velocity of the center of gravity at the takeoff timing in the current (k+1)-th cycle by adding the correction value to the target vertical velocity $V_{gz}(k)$ of the center of gravity at the takeoff timing in the previous k-th cycle.

$V_{gz}(k)$ is also preferably replaced by $V_{gz}(k+1)$ in the equation (1). $V_{gz}(k+1)$ is the target vertical velocity of the center of gravity at the takeoff timing in the (k+1)-th cycle, which is determined in advance, and is obtained based on the gait data 122. In the other hand, the second term "$(g/2) \times \Delta T$" on the right side of the equation (1) corresponds to the amount of the correction for the target vertical velocity based on the time difference $\Delta T$. In this case, the equation (1) can be expressed in the following way. The target velocity determining unit 128 calculates the correction value "$(g/2) \times \Delta T$" for the target vertical velocity, which is approximately proportional to the time difference $\Delta T$ in the previous k-th cycle. The target velocity determining unit 128 then determines the target vertical velocity of the center of gravity at the takeoff timing in the current (k+1)-th cycle by adding the correction value to the target vertical velocity $V_{gz}(k+1)$ of the center of gravity for the takeoff timing in the current (k+1)-th cycle.

The above-described legged robot according to the present invention may be alternatively described in the following way.

(1) A legged robot that periodically repeats a jump motion, which includes motion of taking off, being airborne, and landing, by driving joints of legs, whereas in respective jump cycles, a period in which every leg is off the floor is defined as an aerial phase, and a period before the aerial phase in which at least one leg is in contact with the floor is defined as ground-contact phase, the robot is provided with a storage that stores a target aerial phase period in the respective jump cycles, a measuring means that measures an actual aerial phase period in the respective jump cycles, a velocity determining means that determines a target vertical velocity of the center of gravity of the legged robot at the takeoff timing in the current jump cycle based on a time difference between the target aerial phase period and the actual aerial phase period in the previous jump cycle, and a drive means that drives the joints to realize the target vertical velocity.

(2) The legged robot according to the description (1) may further be provided with a target trajectory generating means that generates a target trajectory of the center of gravity in the ground-contact phase of the current jump cycle so that the vertical velocity may gradually approach the target vertical velocity, and a target joint angle calculating means that calculates time series data of a target joint angle of the respective joints in the ground-contact phase of the current jump cycle based on the generated target trajectory of the center of gravity, whereas the drive means drives the joints based on the calculated time-series data of the target join angles.

(3) The legged robot according to the description (1) or (2) may further be provided with a contact sensor that is provided on a bottom end of the leg and detects a contact with the floor, whereas the measuring means measures a period from a timing of all the legs have taken off the floor to a timing of any of the legs touch the floor as the aerial phase period, based on the output signals of the contact sensor.

(4) The legged robot according to any one of the descriptions (1) to (3) may be configured such that the velocity determining means determines the target vertical velocity in the current jump cycle by adding a velocity approximately proportional to the time difference obtained by subtracting the actual aerial phase period from the target aerial phase period to the target vertical velocity in the current jump cycle.

Although specific example according to the present invention has been detailed above, this is merely an example, and is not intended to limit the scope of claims. The techniques described in the claims include various modifications and alternations.

The technical elements described herein and with reference to the accompanying drawings exhibit technical usefulness either alone or in combination, and are not limited to those described as filed. Moreover, the techniques exemplified herein and in the accompanying drawings can attain multiple objects at the same time, and attaining one of those objects has by itself a technological usefulness.

What is claimed is:

1. A legged robot that runs while repeating a jump cycle including a ground-contact phase from a landing to a takeoff, and an aerial phase from a takeoff to a landing, comprising:
   at least one leg that has a joint;
   a storage that stores a target aerial phase period;
   a measuring device that measures an actual aerial phase period;
   a drive device that drives the joint based on a time difference between the target aerial phase period and the actual aerial phase period; and
   a velocity determining device that determines a target vertical velocity of the center of gravity of the legged robot at the takeoff timing in a current jump cycle based on the time difference in a previous jump cycle,
   wherein the drive device drives the joint such that the determined target vertical velocity is realized, and
   wherein the velocity determining device calculates a velocity correction value approximately proportional to the time difference in the previous jump cycle, and determines the target vertical velocity in the current jump cycle by adding the velocity correction value to the target vertical velocity in the previous jump cycle.

2. The legged robot according to claim 1, further comprising a timing determining device that determines a takeoff timing and a landing timing by detecting a contact between the leg and the ground.

3. The legged robot according to claim 2, wherein the measuring device measures a time interval from the takeoff timing to the landing timing which are determined by the timing determining device as the actual aerial phase period.

4. The legged robot according to claim 1, comprising:
   a target trajectory generating device that generates a trajectory of the center of gravity in the ground-contact phase of the current jump cycle such that the vertical velocity gradually approaches the determined target vertical velocity; and
   a target joint angle calculating device that calculates time series data of a target joint angle of the joint in the ground-contact phase of the current jump cycle based on the generated target trajectory,
   wherein the drive device drives the joint based on the time series data of the target joint angle.

* * * * *